United States Patent Office 2,965,612
Patented Dec. 20, 1960

2,965,612
OIL-SOLUBLE RESINS

Stephen Donald Holland, Urmston, Manchester, and Edward Teggin Borrows, Bowdon, England, assignors to Shell Oil Company, a corporation of Delaware No Drawing. Filed Sept. 4, 1956, Ser. No. 607,574

6 Claims. (Cl. 260—62)

This invention relates to oil-soluble resins and to their preparation from hydrocarbon fractions. More specifically the present invention is concerned with the polymerization of olefin containing hydrocarbon fractions to produce oil-soluble resins having controllable softening points. The hydrocarbon fractions employed are primarily those obtained by distillation of the liquid products of the petroleum cracking processes or by fractional distillation of coal tar. Such fractions may contain in excess of 40% by weight of aromatic olefins and generally boil at approximately 150° to 210° C.

In the past resins generally prepared from these hydrocarbon fractions have been made oil-soluble by polymerizing in the presence of alkyl phenol.

The resins so prepared evidence a significant increase in initial solubility in stand oil, but tend to separate out as a gel within one month. Furthermore, resins containing a significant quantity of alkyl phenol manifest a reduced stability to light. The need for a resin produced from hydrocarbon fractions which evidence high oil solubility without the shortcomings inherent in the alkyl phenol resin has long been apparent to those well versed in the art. It is consequently the principal object of the present invention to provide synthetic resins prepared from hydrocarbon fractions which possess improved characteristics making them particularly suitable for employment in coating compositions. It is another object of the present invention to provide a process for the preparation of a superior oil-soluble resin from hydrocarbon fractions which have heretofore been considered worthless for this purpose. Yet another object of the present invention is to provide a process which is economical yet produces an oil-soluble resin of outstanding quality in high yield. Other objects, features and advantages of the present invention will be apparent from the present specification read in conjunction with the appended claims.

It has now been found that oil-soluble resins of improved stability which are substantially stable can be obtained from hydrocarbon fractions, such as those having a boiling point range of 150° to 210° C. and containing unsaturated aromatic hydrocarbon, for example, indene, styrene and their homologues. It will be understood that the boiling range may vary considerably without departing from the scope of the invention. Thus by means of this new and novel process hydrocarbon fractions which are normally polymerized to yield insoluble or only partially oil-soluble resins in low and high viscosity stand oils may now be polymerized to yield oil-soluble resins. In essence, this highly desirable result is effected by carrying out the polymerization in the presence of alpha-methyl styrene. The polymerization process has been found highly successful in spite of the presence of other components in the hydrocarbon fraction which might be expected to inhibit or altogether prevent the formation of these oil-soluble resins. The resins so prepared are most valuable in the manufacture of surface coating materials which must possess stability to light and manifest high solubility in stand oil. The degree of solubility of these resins depends to a great extent upon the composition of the hydrocarbon fraction from which they are made.

Referring now to the process in greater detail, the quantity of alpha-methyl styrene present in the reaction mixture may vary considerably. Some of the principal factors involved in selecting the quantity of alpha-methyl styrene employed are the origin of the hydrocarbon fraction and the degree of aromaticity and the concentration of unsaturated hydrocarbons in the fraction. The degree of aromatization is primarily dependent upon the composition of the petroleum charging stock cracked and the degree of cracking. It corresponds to the percent by weight of benzene in the fraction distilled over between approximately 78 and 95° C. during the distillation of liquid products using a column of 25 plates and a 10:1 reflux ratio. In general the reaction mixture will contain from 5 to 30 parts by volume of alpha-methyl styrene per 100 parts of hydrocarbon fraction. It will be readily understood, however, that this range may vary considerably without departing from the scope of the invention.

It has also been observed that the addition of alpha-methyl styrene results in a lowering of the softening points of the resins produced. Thus, not only solubility but also softness of the resin at a specific temperature can be controlled through the presence of styrene. In those cases in which the quantity of alpha-methyl styrene required to impart solubility to the product reduces the softening point to an undesirable degree, the employment of a reduced quantity of alpha-methyl styrene coupled with the addition of an alkyl phenol to the reaction mixture may correct this shortcoming. Of the various phenols which may be employed para-butyl phenol and para-octyl phenol are preferred. It has been found that the employment of alkyl phenol should be restricted to the greatest possible extent because of its adverse effect on the light stability of the product. In general the alkyl phenol should not exceed 4 parts per 100 parts by volume of hydrocarbon. It will be evident however that this preparation may vary considerably with the concentration of olefinic hydrocarbon in the fraction.

The polymerization is brought about by reacting the hydrocarbon fraction with alpha-methyl styrene alone, or with an alkyl phenol in the presence of a polymerization catalyst. Among the polymerization catalysts which have been used successfully are aluminum trichloride, stannic chloride, boron trifluoride, activated clays and acids, such as sulfuric or phosphoric acid. Other suitable polymerization catalysts will be obvious to those well versed in the art. It has been found preferable to neutralize the reaction mass at the completion of the polymerization by adding alkali, such as dry lime to the mixture.

The following examples will serve to illustrate the invention but are not to be construed as limiting its scope.

*Example 1*

A hydrocarbon fraction was obtained by distillation from the liquid products of petroleum cracking processes. A mixture of 100 parts by volume of this hydrocarbon fraction, boiling between approximately 150° and 190° C. and having a degree of aromatization of 92 was mixed with 20 parts by volume of α-methyl styrene and was stirred at a temperature of 35 to 45° C. Approximately 0.22% by weight of an acetic acid complex of boron trifluoride, containing approximately 40% by weight boron trifluoride, was added. The temperature was permitted to rise to 60° C. and subsequently cooled and maintained at 45° C. After approximately 15 minutes a second addition of 0.22% by weight of catalyst was made followed by an addition of 0.11% by weight of catalyst 15 minutes later. A final addition of 0.11% by weight of catalyst was made after a further 30 minutes. The total reaction period was about 3 hours producing a reaction product having a final bromine number of 10 to 15. Dry lime was added in an excess of 2% by weight in order to neutralize the mass. The resulting resin solution was filtered and vacuum distilled under a pressure of 15 mm. of Hg and a base temperature of approximately 190° to 230° C. The resin was a pale yellow transparent hard solid, completely soluble in stand oils having a viscosity of 30 and 150 poises. The softening point of the resin was 90° C.

*Example II*

A hydrocarbon fraction was obtained by distillation from the liquid products of petroleum cracking processes. A mixture of 100 parts by volume of this hydrocarbon fraction, boiling between approximately 150° and 190° C. and having a degree of aromatization of 92 was mixed with 15 parts by volume of α-methyl styrene and 1 part p-octyl phenol and stirred at a temperature of about 35 to 45° C. Aluminum trichloride was added. The temperature was permitted to rise to 60° C. and subsequently cooled and maintained at about 45° C. After approximately 15 minutes a second addition of catalyst was made followed by another addition of catalyst 15 minutes later. A final addition was made after a further 30 minutes. The total reaction period was approximately 3 hours producing a reaction product having a final bromine number of 10 to 15. Dry lime was added in excess of 2% by weight in order to neutralize the mass. The resulting resin solution was filtered and vacuum distilled under a pressure of 15 mm. of Hg at a base temperature of approximately 190° to 230° C. The resin was a pale yellow transparent hard solid, completely soluble in stand oils having a viscosity of 30 poises and 150 poises. The softening point of the resin was 105° C.

*Example III*

A hydrocarbon fraction was obtained by distillation from the liquid products of petroleum cracking processes. A mixture of 100 parts by volume of this hydrocarbon fraction, boiling between approximately 150° and 190° C. and having a degree of aromatization of 84 was mixed with 15 parts by volume of α-methyl styrene and was stirred at a temperature of 35 to 45° C. Stannic chloride was added. The temperature was permitted to rise to 60° C. and subsequently cooled and maintained at 45° C. After approximately 15 minutes a second addition of catalyst was made followed by another addition of catlyst 15 minutes later. A final addition was made after a further 30 minutes. The total reaction period was approximately 3 hours producing a reaction product having a final bromine number of 10 to 15. Dry lime was added in an excess of 2% by weight in order to neutralize the mass. The resulting resin solution was filtered and vacuum distilled under a pressure of 15 mm. of Hg and a base temperature of approximately 190° to 230° C. The resin was a pale yellow transparent hard solid, completely soluble in stand oils having a viscosity of 30 poises and 150 poises. The softening point of the resin was 100° C.

*Example IV*

A hydrocarbon fraction was obtained by distillation from the liquid products of petroleum cracking processes. A mixture of 100 parts by volume of this hydrocarbon fraction, boiling between approximately 150° and 190° C. and having a degree of aromatization of 84 was mixed with 10 parts by volume of α-methyl styrene and was stirred at a temperature of 35 to 45° C. Activated clay was added. The temperature was permitted to rise to 60° C. and subsequently cooled and maintained at 45° C. After approximately 15 minutes a second addition of catalyst was made followed by another addition of catlyst 15 minutes later. A final addition was made after a further 30 minutes. The total reaction period was about 3 hours producing a reaction product having a final bromine number of 10 to 15. Dry lime was added in an excess of 2% by weight in order to neutralize the mass. The resulting resin solution was filtererd and vacuum distilled under a pressure of 15 mm. of Hg and a base temperature of approximately 190° to 230° C. The resin was a pale yellow transparent hard solid, completely soluble in stand oils having a viscosity of 30 poises and 150 poises. The softening point of the resin was 107° C.

*Example V*

A hydrocarbon fraction was obtained by distillation from coal tar. A mixture of 100 parts by volume of this hydrocarbon fraction, boiling between approximately 170° and 190° C. was mixed with 30 parts by volume of α-methyl styrene and was stirred at a temperature of 35 to 45° C. Phosphoric acid was added. The temperature was permitted to rise to 60° C. and subsequently cooled and maintained at 45° C. After approximately 15 minutes a second addition of catalyst was made followed by another addition of catalyst 15 minutes later. A final addition was made after a further 30 minutes. The total reaction period was approximately 3 hours producing a reaction product having a final bromine number of 10 to 15. Dry lime was added in an excess of 2% by weight in order to neutralize the mass. The resulting resin solution was filtered and vacuum distilled under a pressure of 15 mm. of Hg at a base temperature of approximately 190° to 230° C. The resulting resin had a softening point of 120° C. and was soluble in 150 poise stand oil.

*Example VI*

A hydrocarbon fraction was obtained by distillation from the liquid products of petroleum cracking processes. A mixture of 100 parts by volume of this hydrocarbon fraction boiling between approximately 150° and 190° C. and having a degree of aromatization of 84 was mixed with 10 parts by volume of α-methyl styrene and was stirred at a temperature of 35° to 45° C. Sulfuric acid was added. The temperature was permitted to rise to 60° C. and subsequently cooled and maintained at 45° C. After approximately 15 minutes a second addition of catalyst was made followed by another addition of catalyst 15 minutes later. A final addition of sulfuric acid was made after a further 30 minutes. The total reaction period was approximately 3 hours producing a reaction product having a final bromine number of 10 to 15. Dry lime was added in excess of 2% by weight in order to neutralize the mass. The resulting resin solution was filtered and vacuum distilled under a pressure of 15 mm. of Hg and a base temperature of approximately 190° to 230° C. The resin was a pale yellow, transparent, hard solid completely soluble in stand oils having a viscosity of 30 poises and 150 poises. The softening point of the resin was 107° C.

It has been noted that polymerization of coal tar fractions such as these described in Example V, in the absence of an α-methyl styrene, results in a resin of softening point higher than 150° C. The resin so preapred is totally insoluble in all stand oils and shows a Nujol cloud point of 145° C. In other words, below this temperature it is incompatible with Nujol, a high aniline-point liquid paraffin. Upon further polymerization of a mixture containing 100 parts of this coal tar fraction and 10 parts of p-octyl phenol a resin which is insoluble in stand oil is produced.

While the total amount of catalyst employed in all examples was no more than 0.66% part weight of the reaction mixture, this quantity may vary significantly without adversely effecting the polymerization. Thus, it has been found that 0.5 to 0.8% by weight of catalyst may be employed successfully.

The oil-soluble resin produced in accordance with the present invention generally have molecular weights ranging between approximately 900 and 1200, as determined by intrinsinc viscosity measurements, and manifest softening points ranging between about 90 and 130° C. It is, of course, possible to produce resins of even higher softening points when coal tar fractions are polymerized in accordance with the present invention.

Coating compositions containing these resins may be formulated in the usual manner with driers, as for example oleates of cobalt, magnesium, lead, zinc, etc., pigments and other conventional additives and modifiers. It will be obvious that many variations may be made in the products and processes of this invention without departing from the spirit and scope thereof as defined in the appended claims.

We claim as our invention:

1. A process for the preparation of an oil-soluble resin from hydrocarbon fractions boiling between 150° C. and 190° C. which contain unsaturated aromatic compounds in an amount in excess of 40% by weight and which are capable of polymerizing to a solid resin, comprising the steps of adding from about 5 to about 30 parts by volume of alpha-methyl styrene per 100 parts of hydrocarbon fraction, polymerizing the mixture in the presence of a catalyst selected from the class consisting of aluminum trichloride, stannic chloride, boron trifluoride, activated clays and acids, and separating the solid fraction having molecular weights ranging between approximately 900 and 1200, as determined by intrinsic viscosity measurements, from the polymerized mixture.

2. A process for the preparation of an oil-soluble resin from hydrocarbon fractions boiling between 150° C. and 190° C. which contain unsaturated aromatic compounds in an amount in excess of 40% by weight and which are capable of polymerizing to a solid resin, comprising the steps of adding from about 5 to about 30 parts by volume of alpha-methyl styrene per 100 parts of hydrocarbon fraction and an alkyl phenol in an amount not exceeding 4 parts by volume per 100 parts by volume of said petroleum fraction, polymerizing the mixture in the presence of a catalyst selected from the class consisting of aluminum trichloride, stannic chloride, boron trifluoride, activated clays and acids, and separating the solid fraction having molecular weights ranging approximately 900 and 1200, as determined by intrinsic viscosity measurements, from the polymerized mixture.

3. The process defined in claim 2, in which the alkyl phenol is p-octyl phenol.

4. A process for the preparation of an oil-soluble resin from hydrocarbon fractions boiling between 170° C. and 190° C. which contain unsaturated aromatic compounds in an amount in excess of 40% by weight and which are capable of polymerizing to a solid resin, comprising the steps of adding from about 5 to about 30 parts by volume of alpha-methyl styrene per 100 parts of hydrocarbon fraction, and polymerizing the mixture.

5. A process for the preparation of an oil-soluble resin from hydrocarbon fractions boiling between 170° C. and 190° C. which contain unsaturated aromatic compounds in an amount in excess of 40% by weight and which are capable of polymerizing to a solid resin, comprising the steps of adding from about 5 to about 30 parts by volume of alpha-methyl styrene per 100 parts of hydrocarbon fraction and an alkyl phenol in an amount not exceeding 4 parts by volume per 100 parts by volume of said petroleum fraction, polymerizing the mixture in the presence of a catalyst selected from the class consisting of aluminum trichloride, stannic chloride, boron trifluoride, activated clays and acids, and separating the solid fraction having molecular weights ranging between approximately 900 and 1200, as determined by intrinsic viscosity measurements, from the polymerized mixtures.

6. The process defined in claim 5, in which the alkyl phenol is p-octyl phenol.

References Cited in the file of this patent

UNITED STATES PATENTS

| | | |
|---|---|---|
| 2,140,545 | Pier et al. | Dec. 20, 1938 |
| 2,582,425 | Geiser | Jan. 15, 1952 |
| 2,595,581 | Highet et al. | May 6, 1952 |